United States Patent
Wang et al.

(10) Patent No.: US 11,614,562 B1
(45) Date of Patent: Mar. 28, 2023

(54) METHOD AND SYSTEM FOR IDENTIFYING EXTREME CLIMATE EVENTS

(71) Applicants: Nanjing University of Information Science & Technology, Nanjing (CN); National Climate Center, Beijing (CN)

(72) Inventors: Guojie Wang, Nanjing (CN); Buda Su, Beijing (CN); Jinlong Huang, Nanjing (CN); Yanjun Wang, Nanjing (CN); Jianqing Zhai, Beijing (CN); Tong Jiang, Beijing (CN)

(73) Assignees: Nanjing University of Information Science & Technology, Nanjing (CN); National Climate Center, Beijing (CN)

( * ) Notice: Subject to any disclaimer, the term of this patent is extended or adjusted under 35 U.S.C. 154(b) by 0 days.

(21) Appl. No.: 17/863,914

(22) Filed: Jul. 13, 2022

(30) Foreign Application Priority Data

Nov. 25, 2021 (CN) .......................... 202111412313.4

(51) Int. Cl.
*G01W 1/00* (2006.01)
(52) U.S. Cl.
CPC .................................... *G01W 1/00* (2013.01)
(58) Field of Classification Search
CPC ....................................................... G01W 1/00
See application file for complete search history.

(56) References Cited

U.S. PATENT DOCUMENTS 10,267,951 B2 * 4/2019 Lemos .................... G01W 1/10

11,315,046 B1 * 4/2022 Cook ........................ G06N 5/04
2010/0332474 A1 * 12/2010 Birdwell ............ G06V 10/7635
707/E17.089
2020/0372349 A1 * 11/2020 Gaitan Ospina ..... G06N 3/0454

FOREIGN PATENT DOCUMENTS

| CN | 108336179 A | 7/2018 | |
|---|---|---|---|
| CN | 108540205 A | 9/2018 | |
| WO | WO-2022011728 A1 * | 1/2022 | ........... G06K 9/6218 |

OTHER PUBLICATIONS

Jing Cheng et al.: "A study on regional extreme precipitation events and the exposure of population and economy in China", Acta Meteorologica Sinica Aug. 15, 2016, vol. 74, No. 4 pp. 572-582—English abstract.

* cited by examiner

*Primary Examiner* — Yoshihisa Ishizuka
(74) *Attorney, Agent, or Firm* — Laurence A. Greenberg; Werner H. Stemer; Ralph E. Locher

(57) ABSTRACT

The present application provides a method and system for identifying extreme climate events. The method acquires climate index (CI) grid data of a to-be-identified region within an extreme climate time period, and gradually expands each of event centers in the to-be-identified region, until CI values of all grids adjacent to the event center are not greater than a CI threshold. The method can obtain extreme climate impacted areas of extreme climate events in the to-be-identified region, and can further obtain CI intensities of the extreme climate events by average calculation. The method can obtain three pieces of dimension information on each of the extreme climate events in the to-be-identified region, including an extreme climate impacted area, a CI intensity and a duration. Therefore, the method can identify the extreme climate events more comprehensively.

20 Claims, 5 Drawing Sheets

METHOD AND SYSTEM FOR IDENTIFYING EXTREME CLIMATE EVENTS

CROSS REFERENCE TO RELATED APPLICATION

This patent application claims the benefit and priority of Chinese Patent Application No. 202111412313.4, filed on Nov. 25, 2021, the disclosure of which is incorporated by reference herein in its entirety as part of the present application.

TECHNICAL FIELD

The present application belongs to the field of meteorology, and in particular to a method and system for identifying extreme climate events.

BACKGROUND ART

As a regional phenomenon, extreme climate events are defined as those with climate indexes (CIs) exceeding climate thresholds over continuous areas in a given duration. The extreme climate events, in which states of the climates are seriously deviated from average states, are statistically considered as rare and small probability events. Extreme climates include droughts, floods, heat waves, cold damages, etc. The CIs of the extreme climates involve an extreme temperature, extreme precipitation and so on.

Under the circumstance of global warming, there is an increase in the frequency and intensity of the extreme climate events, and the extreme climate events occur abruptly and unpredictably, all of which have a profound impact on economic development and ecological environments in the society. Therefore, it is imperative to objectively identify and record the extreme climate events.

SUMMARY

An objective of the present application is to provide a method and system for identifying extreme climate events, to solve the above problems.

Embodiments of the present application are achieved as follows:

According to a first aspect, the present application provides a method for identifying extreme climate events, including:

acquiring CI grid data of a to-be-identified region within an extreme climate time period, dividing the to-be-identified region into multiple research regions according to a research objective, and taking CI grids as to-be-identified grids of different regions;

searching a grid with a maximum absolute value of a CI value in to-be-identified grids of each of the single research regions on different time scales to serve as an event center, the CI value being a CI threshold of the event center;

searching a grid with a maximum absolute value of a CI value in other adjacent grids on a present time scale of the event center to serve as a target grid, expanding the event center to the target grid, expanding the CI threshold to an average of the two CI values, expanding the event center continuously according to the above method, and expanding the CI threshold to an average of CI values whenever the event center is expanded, until CI values of all grids adjacent to the event center are not greater than the CI threshold; and taking continuous grid areas of event centers as extreme climate impacted areas of extreme climate events, and taking CI thresholds of the event centers as corresponding CI values.

In an optional embodiment of the present application, the CI grid data may include grid information and CI values; and the grid information may include grid areas and grid coordinates.

In an optional embodiment of the present application, the CI values each may include a temperature or an amount of precipitation.

It may be understood that an extreme high-temperature event may lead to a heat wave; an extreme low-temperature event may lead to a cold damage; an extreme heavy-precipitation event may lead to a disaster such as a flood and a snowstorm; and an extreme rare-precipitation event may lead to a disaster such as a drought.

It may be understood that the method for identifying extreme climate events provided by the present application acquires CI grid data of a to-be-identified region within an extreme climate time period, and gradually expands each of event centers in the to-be-identified region, until CI values of all grids adjacent to the event center are not greater than a CI threshold. The method can obtain extreme climate impacted areas of multiple extreme climate events in the to-be-identified region.

In an optional embodiment of the present application, the method may further include: taking an average of CI values of all grids over an area of each of the event centers as a CI intensity of a corresponding one of the extreme climate events.

It may be understood that, in combination with the extreme climate impacted areas obtained in the above steps, the method may obtain three pieces of dimension information on each of the extreme climate events in the to-be-identified region, including an extreme climate impacted area, a CI intensity and a duration. The duration may include a preset extreme climate time scale.

In some optional embodiments of the present application, the method may further include:

taking a continuous grid area of the event center as an impacted area of the extreme climate event; and drawing an intensity area duration (IAD) curve corresponding to the extreme climate event, a horizontal coordinate of the IAD curve being the impacted area, and a vertical coordinate of the IAD curve being the CI intensity.

It may be understood that each extreme climate event corresponds to one IAD curve. The duration includes different preset extreme climate time scales in the method, so the IAD curve intuitively reflects a relationship between the area and the intensity of the extreme climate event in a given duration.

In an optional embodiment of the present application, the method may further include: drawing IAD curves of all extreme climate events in the to-be-identified region on a graph; and selecting curves of all extreme climate events on different time scales, and connecting points with highest CI intensities over different impacted areas to form an IAD envelope.

It may be understood that the IAD envelope can reflect highest intensities that the extreme climate events can reach on different time scales in the to-be-identified region.

In an optional embodiment of the present application, before the acquiring CI grid data of a to-be-identified region within an extreme climate time period, the method may further include: acquiring a query instruction, the query instruction including the extreme climate time period, the to-be-identified region and an index threshold range; and the method may further include: outputting the extreme climate impacted areas and the CI intensities corresponding to the extreme climate events in the to-be-identified region.

It may be understood that the extreme climate time period, the to-be-identified region and the index threshold range may be preset by an identification server, and may also be defined by a query terminal. After obtaining the extreme climate impacted areas and the CI intensities corresponding to the extreme climate events, the identification server may transmit them to the query terminal.

In an optional embodiment of the present application, the method may further include: outputting the IAD curves corresponding to the extreme climate events in the to-be-identified region; and outputting the IAD envelope corresponding to the to-be-identified region.

It may be understood that, after obtaining the IAD curves corresponding to the extreme climate events and the IAD envelope corresponding to the to-be-identified region, the identification server may transmit them to the query terminal.

According to a second aspect, the present application provides a system for identifying extreme climate events, including: an identification server, where the identification server is configured to execute the method for identifying extreme climate events described in the first aspect.

In an optional embodiment of the present application, the system may further include:

multiple query terminals;

the identification server may further be configured to receive a query instruction from each of the query terminals, the query instruction including the extreme climate time period, the to-be-identified region and the index threshold range; and the identification server may further be configured to output the extreme climate impacted areas and the CI intensities corresponding to extreme climate events in the to-be-identified region to a corresponding one of the query terminals.

In an optional embodiment of the present application, the identification server may further be configured to output the IAD curves corresponding to the extreme climate events in the to-be-identified region to a corresponding one of the query terminals; and the identification server may further be configured to output the IAD envelope corresponding to the to-be-identified region to a corresponding one of the query terminals.

The technical solutions of the present application achieve the following beneficial effects over the prior art:

The present application provides a method and system for identifying extreme climate events. The method acquires CI grid data of a to-be-identified region within an extreme climate time period, and gradually expands each of event centers in the to-be-identified region, until CI values of all grids adjacent to the event center are not greater than a CI threshold. The method can obtain extreme climate impacted areas in the to-be-identified region, and can further obtain CI intensities of the extreme climate events by average calculation. The method can obtain three pieces of dimension information on each of the extreme climate events in the to-be-identified region, including an extreme climate impacted area, a CI intensity and a duration. Therefore, the method can identify the extreme climate events more comprehensively.

In order to make the above objectives, features, and advantages of the present application clearer and more understandable, the present application is described in detail below with optional embodiments and the accompanying drawings.

BRIEF DESCRIPTION OF THE DRAWINGS

To describe the technical solutions in the embodiments of this application more clearly, the accompanying drawings required in the embodiments are briefly described below. It should be understood that, the following accompanying drawings show merely some embodiments of this application, and thus should not be regarded as a limitation to the scope of this application. Those of ordinary skill in the art may still derive other related drawings from these accompanying drawings without creative efforts.

DETAILED DESCRIPTION OF THE EMBODIMENTS

The technical solutions in the embodiments of the present application are clearly and completely described below with reference to the drawings in the embodiments of the present application. Apparently, the described embodiments are merely some rather than all of the embodiments of the present application. All other embodiments obtained by those of ordinary skill in the art based on the embodiments of the present application without creative efforts should fall within the protection scope of the present application.

Figure 1:
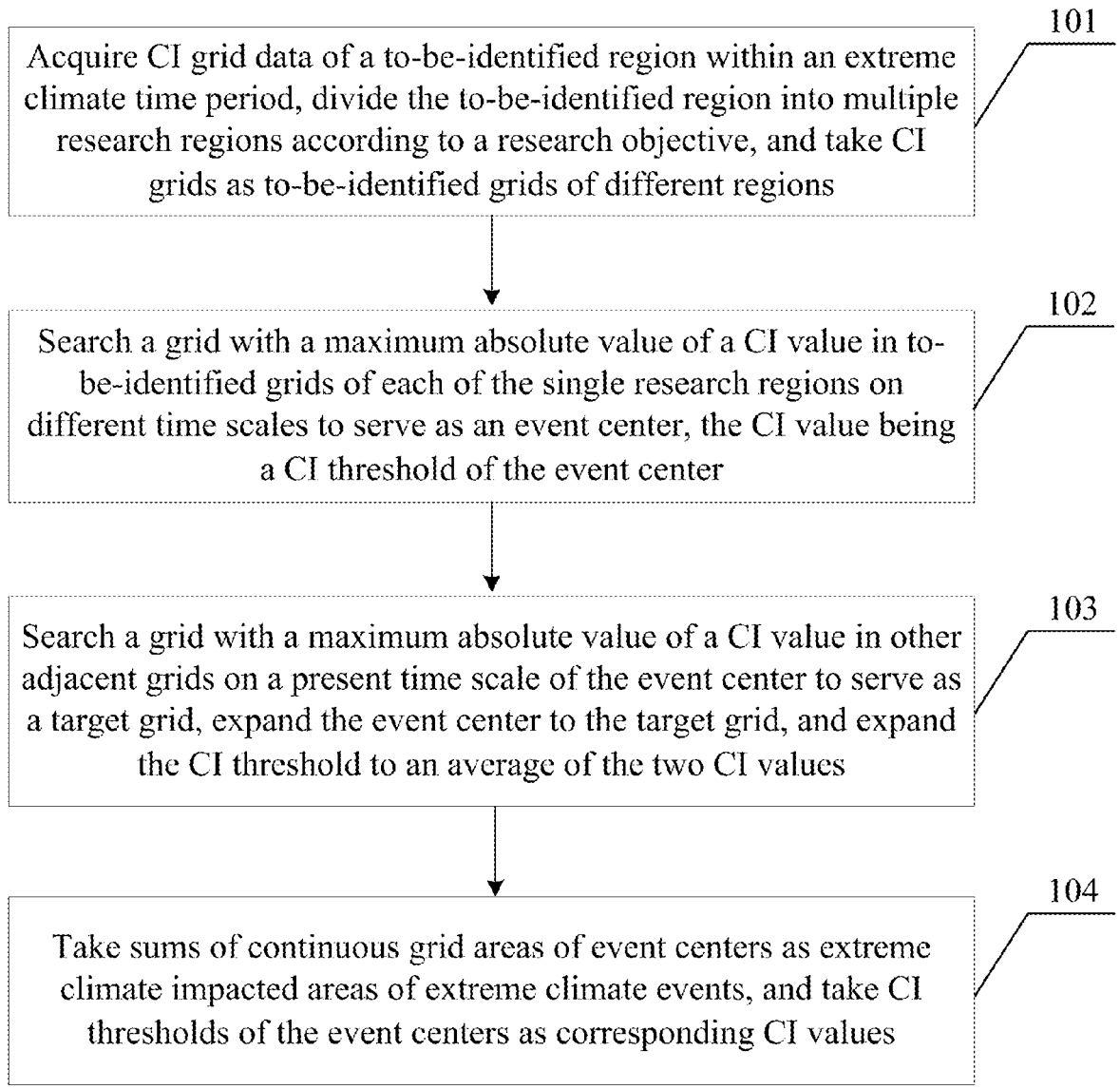
FIG. 1 is a schematic flowchart of a method for identifying extreme climate events according to the present application.

As shown in FIG. 1, the present application provides a method for identifying extreme climate events. An execution main body of the method may be an identification server. The method includes the following steps:

101: Acquire CI grid data of a to-be-identified region within an extreme climate time period, divide the to-be-identified region into multiple research regions according to a research objective, and take CI grids as to-be-identified grids of different regions.

In an optional embodiment of the present application, the CI grid data includes grid information and CI values; and the grid information includes grid areas and grid coordinates.

In an optional embodiment of the present application, the CI values each include a temperature or an amount of precipitation.

It may be understood that an extreme high-temperature event may lead to a heat wave; an extreme low-temperature event may lead to a cold damage; an extreme heavy-precipitation event may lead to a disaster such as a flood and a snowstorm; and an extreme rare-precipitation event may lead to a disaster such as a drought.

In an optional embodiment of the present application, the extreme climate time period and the to-be-identified region may be preset by the server, and may also be defined by the querier. The extreme climate time period refers to durations of the extreme climate events. The to-be-identified region may be a region with extreme climate events to be identified for the querier, such as a city and a country.

The CI grid data refers to multiple high-intensity CI data distributed in various to-be-monitored regions and acquired by the meteorological observation station. Thin plate spline (TPS) of ANUSPLIN software is employed for spatial interpolation, thereby obtaining a grid dataset having a certain precision, such as a 0.5°×0.5° precipitation grid dataset. The grid data makes the calculation and determination of the extreme climate events simpler and more convenient.

102: Search a grid with a maximum absolute value of a CI value in to-be-identified grids of each of the single research regions on different time scales to serve as an event center, the CI value being a CI threshold of the event center.

Figure 2:
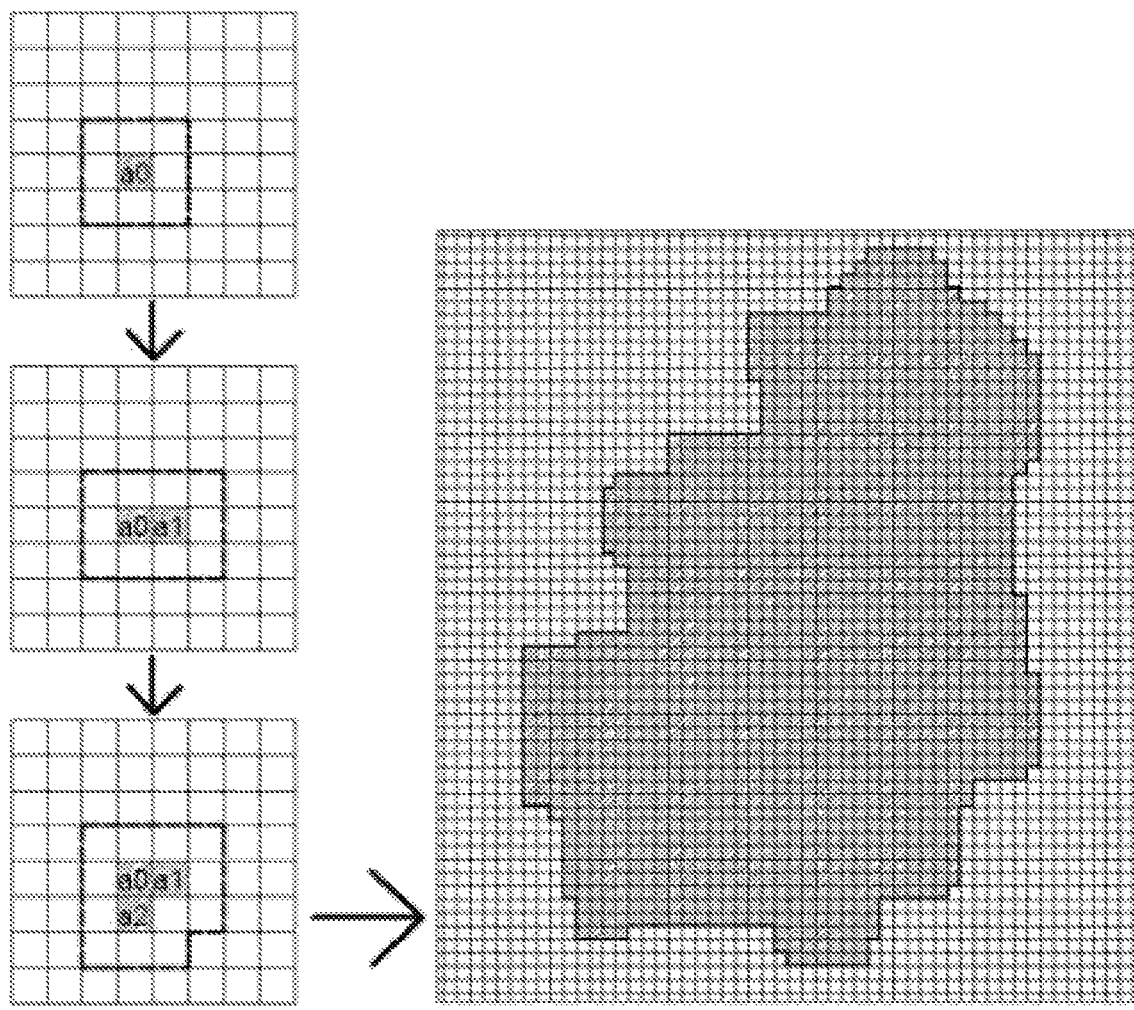
FIG. 2 is a schematic view of a step for identifying an extreme climate grid of a single extreme climate event in the method for identifying extreme climate events in FIG. 1.

For example, as shown by the top left picture of FIG. 2, the grid a0 (the shadow grid in the picture) with the maximum absolute value of the CI value is searched in the to-be-identified region to serve as the event center.

103: Search a grid with a maximum absolute value of a CI value in adjacent grids on a present time scale of the event center to serve as a target grid, expand the event center to the target grid, expand the CI threshold to an average of the two CI values, expand the event center continuously according to the above method, and expand the CI threshold to an average of CI values whenever the event center is expanded, until CI values of all grids adjacent to the event center are not greater than the CI threshold.

As shown by the top left picture of FIG. 2, the grid a0 (the shadow grid in the picture) with the maximum absolute value of the CI value is searched in the to-be-identified region to serve as the event center. A CI value of the grid is a CI threshold of the event center.

Grids enclosed by a dotted box in the upper left picture are those connected to the event center. With analysis on the eight grids, a grid with a maximum absolute value of a CI value is searched to serve as a first target grid a1.

The first target grid a1 is also included in the area of the event center, as shown by shadow grids in the middle left picture of FIG. 2. The CI threshold is expanded to an average of the two CI values.

Grids enclosed by a dashed box in the middle left picture are those connected to the event center. With analysis on the ten grids, a grid with a maximum absolute value of a CI value serves as a second target grid a2.

The second target grid a2 is also included in the area of the event center, as shown by shadow grids in the bottom left picture of FIG. 2. The CI threshold is expanded to an average of CI values. A target grid is continuously searched around the event center, until CI values of all grids adjacent to the event center are not greater than the CI threshold, as shown by the right picture of FIG. 2. The shadow region in the right picture is the final area of the event center, namely an extreme climate impacted area of the extreme climate event, and an extreme climate impacted area of a first extreme climate event in FIG. 3.

Steps 102 and 103 are executed continuously to obtain other extreme climate events in the to-be-identified region.

104: Take continuous grid areas of event centers as extreme climate impacted areas of extreme climate events, and take CI thresholds of the event centers as corresponding CI values.

It may be understood that the method for identifying extreme climate events acquires CI grid data of a to-be-identified region within an extreme climate time period, and gradually expands each of event centers in the to-be-identified region, until CI values of all grids adjacent to the event center are not greater than a CI threshold. The method can obtain the extreme climate impacted areas of the extreme climate events in the to-be-identified region.

In an optional embodiment of the present application, the method further includes: Take an average of CI values of all grids over an area of each of the event centers as a CI intensity of a corresponding one of the extreme climate events.

It may be understood that, in combination with the extreme climate impacted areas obtained in the above steps, the method may obtain three pieces of dimension information on each of the extreme climate events in the to-be-identified region, including an extreme climate impacted area, a CI intensity and a duration. The duration includes a preset extreme climate time scale.

In an optional embodiment of the present application, the method further includes:

Take, in an extreme climate impacted area of each of the extreme climate events, a grid with a maximum absolute value of a CI value as an event center.

Draw an IAD curve corresponding to the extreme climate event, a horizontal coordinate of the IAD curve being the impacted area, and a vertical coordinate of the IAD curve being the CI intensity.

It may be understood that each extreme climate event corresponds to one IAD curve. The duration includes different preset extreme climate time scales in the method, so the IAD curve intuitively reflects a relationship between the extreme climate impacted area and the CI intensity in a special time period.

Figure 3:
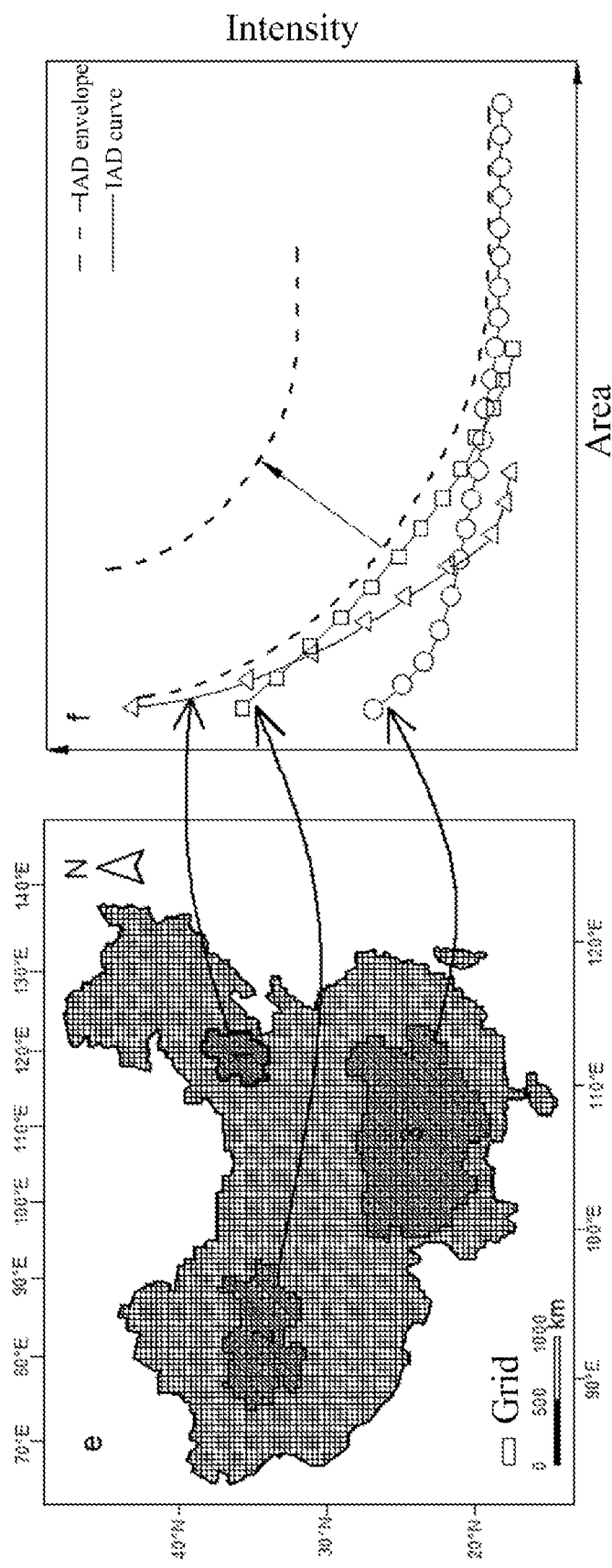
FIG. 3 is a schematic view for drawing an IAD curve and an IAD envelope according to the present application.

As shown in FIG. 3, the IAD curve corresponding to the first extreme climate event is shown by a triangular icon connected line in the right picture of FIG. 3, the IAD curve corresponding to the second extreme climate event is shown by a rectangular icon connected line in the right picture of FIG. 3, and the IAD curve corresponding to the third extreme climate event is shown by a circular icon connected line in the right picture of FIG. 3.

In an optional embodiment of the present application, the method further includes: Draw IAD curves of all extreme climate events in the to-be-identified region on a graph; and select curves of all extreme climate events on different given time scales, and connect points with highest CI intensities over different impacted areas to form an IAD envelope.

As shown by the right picture of FIG. 3, the IAD envelope for the first extreme climate event, the second extreme climate event and the third extreme climate event is shown by the top right dotted curve. It may be understood that the IAD envelope can reflect highest intensities that the extreme climate events can reach over different impacted areas in a given time scale.

Accordingly, the present application provides a system for identifying extreme climate events, including: an identification server. The identification server is configured to execute the method for identifying extreme climate events described above.

Figure 4:
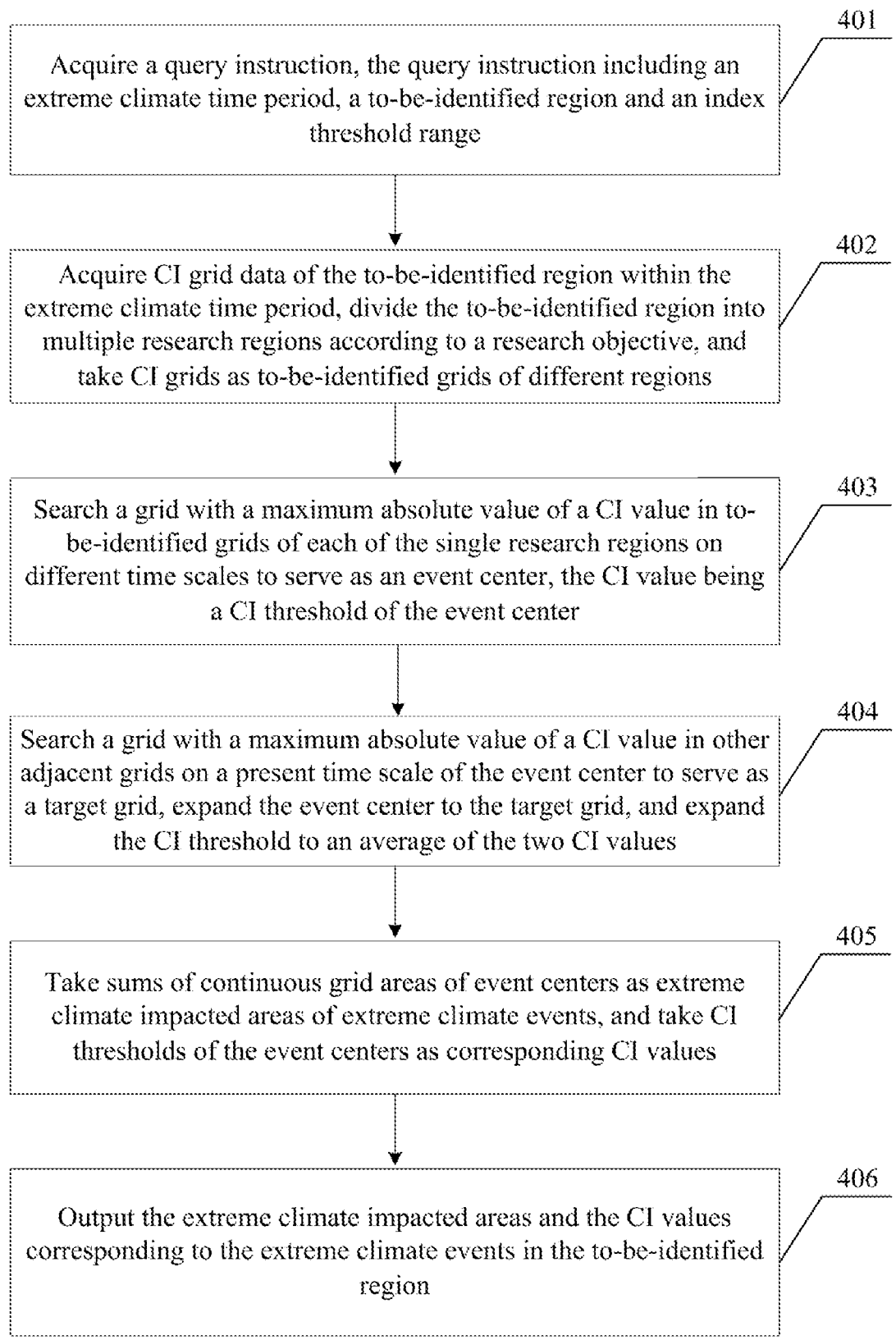
FIG. 4 is a schematic flowchart of another method for identifying extreme climate events according to the present application.

As shown in FIG. 4, the present application further provides a method for identifying extreme climate events. Compared with the above method, the method further includes the following steps:

401: Acquire a query instruction, the query instruction including an extreme climate time period, a to-be-identified region and an index threshold range.

406: Output extreme climate impacted areas and CI intensities corresponding to extreme climate events in a to-be-identified region.

As shown in FIG. 4, the method further includes the following steps:

402: Acquire CI grid data of the to-be-identified region within the extreme climate time period, divide the to-be-identified region into multiple research regions according to a research objective, and take CI grids as to-be-identified grids of different regions.

403: Search a grid with a maximum absolute value of a CI value in to-be-identified grids of each of the single research regions on different time scales to serve as an event center, the CI value being a CI threshold of the event center.

404: Search a grid with a maximum absolute value of a CI value in other adjacent grids on a present time scale of the event center to serve as a target grid, expand the event center to the target grid, and expand the CI threshold to an average of the two CI values.

405: Take sums of continuous grid areas of event centers as extreme climate impacted areas of extreme climate events, and take CI thresholds of the event centers as corresponding CI values.

It may be understood that the extreme climate time period, the to-be-identified region and the index threshold range may be preset by the identification server, and may also be defined by the query terminal. After obtaining the extreme climate impacted areas and the CI intensities corresponding to the extreme climate events, the identification server may transmit them to the query terminal.

In an optional embodiment of the present application, the method may further include: Output IAD curves corresponding to the extreme climate events in the to-be-identified region; and output an IAD envelope corresponding to the to-be-identified region.

It may be understood that, after obtaining the IAD curves corresponding to the extreme climate events and the IAD envelope corresponding to the to-be-identified region, the identification server may transmit them to the query terminal.

Figure 5:
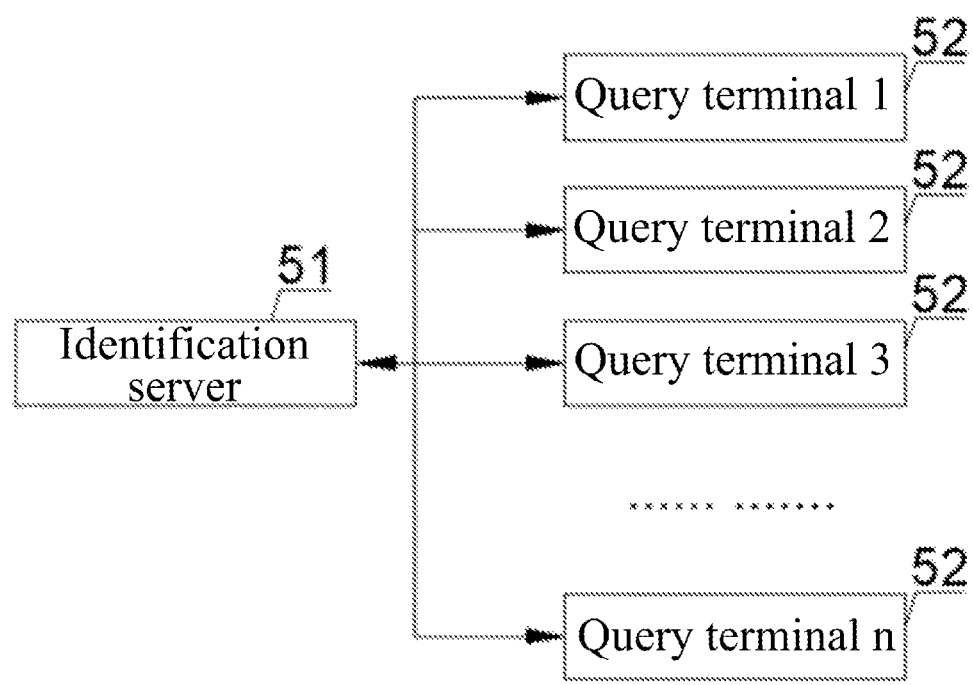
FIG. 5 is a schematic view of a system for identifying extreme climate events according to the present application.

Accordingly, as shown in FIG. 5, the present application provides another system for identifying extreme climate events, including: an identification server 51 and multiple query terminals 52.

The identification server 51 is configured to receive a query instruction from each of the query terminals 52, the query instruction including an extreme climate time period, a to-be-identified region and an index threshold range;

the identification server 51 is further configured to execute the method for identifying extreme climate events described above; and the identification server 51 is further configured to output the extreme climate impacted areas and the CI intensities corresponding to the extreme climate events in the to-be-identified region to a corresponding one of the query terminals.

In an optional embodiment of the present application, the identification server 51 is further configured to output the IAD curves corresponding to the extreme climate events in the to-be-identified region to a corresponding one of the query terminals 52; and the identification server 51 is further configured to output the IAD envelope corresponding to the to-be-identified region to a corresponding one of the query terminals 52.

The present application provides a method and system for identifying extreme climate events. The method acquires CI grid data of a to-be-identified region within an extreme climate time period, and gradually expands each of event centers in the to-be-identified region, until CI values of all grids adjacent to the event center are not greater than a CI threshold. The method can obtain extreme climate impacted areas of extreme climate events in the to-be-identified region, and can further obtain CI intensities of the extreme climate events by average calculation. The method can obtain three pieces of dimension information on each of the extreme climate events in the to-be-identified region, including an extreme climate impacted area, a CI intensity and a duration. Therefore, the method can identify the extreme climate events more comprehensively.

The embodiments in the present application are described in a progressive manner. For same or similar parts between the embodiments, reference may be made to each other. Each embodiment focuses on a difference from other embodiments. For an apparatus, device and medium embodiments, since they are basically similar to the method embodiment, the description is relatively simple, and reference can be made to the description of the method embodiment.

The specific embodiments of the subject matter have been disclosed. Other embodiments fall within the scope of the appended claims. In some cases, the actions described in the claims may be performed in sequences different from those in the embodiments and still achieve expected results. In addition, the processes depicted in the accompanying drawings do not necessarily require the specific orders or sequential orders shown for achieving the expected results. In some implementations, multitasking and parallel processing may be advantageous.

Expressions "first", "second", "the first" or "the second" used in various implementation of the present application can modify various components and are unrelated with the sequence and/or importance. However, these expressions do not limit the corresponding components, but are merely used to distinguishing elements from other elements. For example, a first user device and a second user device indicate different user devices, through both are the user devices. For example, without departing from the scope of disclosure of the present application, a first element may be referred to as a second element, and similarly, a second element may be referred to as a first element.

When an element (such as a first element) is "(operably or communicatively) coupled" with another element (such as a second element) or "(operably or communicatively) coupled to" another element (such as a second element) or "connected to" another element (such as a second element), it should be understood that the element is directly connected to the another element or the element is indirectly connected to the another element via still another element (such as a third element). Conversely, it may be understood that when an element (such as a first element) is "directly connected" or "directly coupled" to another element (such as a second element), there is no element (such as a third element) therebetween.

The above description is merely an illustration of preferred embodiments of this application and the technical principle in use. Those skilled in the art should understand that, the scope of invention of this application is not limited to the technical solution formed by a specific combination of the foregoing technical features, but should cover other technical solutions formed by any combination of the foregoing technical features or equivalent features thereof without departing from the foregoing inventive concept. For example, a technical solution formed by replacing the foregoing feature with a technical feature having a similar function disclosed in (but not limited to) this application.

The foregoing descriptions are merely preferred embodiments of this application, and are not intended to limit this application. For those skilled in the art, various modifications and changes may be made to this application. Any modifications, equivalents, improvements, etc. made within the spirit and principle of the present application shall all fall within the protection scope of the present application.

What is claimed is:

1. A method for identifying extreme climate events, comprising:
    acquiring, by sensors at meteorological observation stations, climate index (CI) grid data of a target region within an extreme climate time period, dividing the target region into multiple research regions according to a research objective, and deeming CI grids of different regions as target grids of the different regions, the CI grid data including grid information and a CI value, the grid information including grid areas and grid coordinates, the CI value including one of a temperature or an amount of precipitation;
    searching a first grid with a maximum absolute value of a CI value in target grids of each of the research regions on different time scales as an event center, a CI value of the first grid being a CI threshold of the event center;
    carrying out an expanding step, configured for searching a second grid with a maximum absolute value of a CI value in other adjacent grids on a present time scale of the event center as a target grid, expanding the event center to the target grid, expanding the CI threshold to an average of two CI values of the first grid and the second grid;
    repeating the expanding step, until CI values of other grids adjacent to the event center are not greater than the CI threshold; and
    obtaining continuous grid areas of event centers as extreme climate impacted areas of extreme climate events, and obtaining CI thresholds of the event centers as corresponding CI values.

2. The method for identifying extreme climate events according to claim 1, wherein
    the method further comprises: deeming an average of CI values of continuous grids of each of the event centers as a CI intensity of a corresponding one of the extreme climate events.

3. The method for identifying extreme climate events according to claim 2, wherein the CI grid data includes grid information and CI values; and the grid information includes grid areas and grid coordinates.

4. The method for identifying extreme climate events according to claim 2, wherein
    the method further comprises: deeming a continuous grid area of the event center as an impacted area of the extreme climate event; and
    drawing an intensity area duration (IAD) curve corresponding to the extreme climate event, a horizontal coordinate of the IAD curve being the impacted area, and a vertical coordinate of the IAD curve being the CI intensity.

5. The method for identifying extreme climate events according to claim 4, wherein the CI grid data includes grid information and CI values; and the grid information includes grid areas and grid coordinates.

6. The method for identifying extreme climate events according to claim 4, wherein
    the method further comprises: drawing IAD curves of all extreme climate events in the target region on a graph; and selecting curves of all extreme climate events under a same time scale, and connecting points with highest CI intensities over different impacted areas to form an IAD envelope.

7. The method for identifying extreme climate events according to claim 6, wherein the CI grid data includes grid information and CI values; and the grid information includes grid areas and grid coordinates.

8. The method for identifying extreme climate events according to claim 6, wherein
    before the acquiring of CI grid data of a target region within an extreme climate time period, the method further comprises: acquiring a query instruction, the query instruction including the extreme climate time period, the target region and an index threshold range; and
    the method further comprises: outputting the extreme climate impacted areas and the CI intensities corresponding to the extreme climate events in the target region.

9. The method for identifying extreme climate events according to claim 8, wherein
    the method further comprises: outputting the IAD curves corresponding to the extreme climate events in the target region; and outputting the IAD envelope corresponding to the target region.

10. The method for identifying extreme climate events according to claim 1, wherein the CI grid data includes grid information and CI values; and the grid information includes grid areas and grid coordinates.

11. The method for identifying extreme climate events according to claim 1, wherein the CI values each include a temperature or an amount of precipitation.

12. A system for identifying extreme climate events, comprising an identification server, wherein
    the identification server is configured to execute the method for identifying extreme climate events according to claim 1.

13. The system for identifying extreme climate events according to claim 12, wherein the CI grid data comprises includes grid information and CI values; and the grid information comprises includes grid areas and grid coordinates.

14. The system for identifying extreme climate events according to claim 12, wherein the CI values each include a temperature or an amount of precipitation.

15. The system for identifying extreme climate events according to claim 12, wherein
    the system further comprises multiple query terminals; and
    the identification server is further configured to receive a query instruction from each of the query terminals, the query instruction including the extreme climate time period, the target region and the index threshold range; and the identification server is further configured to output the extreme climate impacted areas and the climate index (CI) intensities corresponding to the extreme climate events in the target region to a corresponding one of the query terminals.

16. The system for identifying extreme climate events according to claim 12, wherein
    the method further comprises: deeming an average of CI values of continuous grids of each of the event centers as a CI intensity of a corresponding one of the extreme climate events.

17. The system for identifying extreme climate events according to claim 16, wherein
- the method further comprises: deeming a continuous grid area of the event center as an impacted area of the extreme climate event; and
- drawing an intensity area duration (IAD) curve corresponding to the extreme climate event, a horizontal coordinate of the IAD curve being the impacted area, and a vertical coordinate of the IAD curve being the CI intensity.

18. The system for identifying extreme climate events according to claim 17, wherein
- the method further comprises: drawing IAD curves of all extreme climate events in the target region on a graph; and selecting curves of all extreme climate events under a same time scale, and connecting points with highest CI intensities over different impacted areas to form an IAD envelope.

19. The system for identifying extreme climate events according to claim 18, wherein
- before the acquiring CI grid data of a target region within an extreme climate time period, the method further comprises: acquiring a query instruction, the query instruction including the extreme climate time period, the target region and an index threshold range; and
- the method further comprises: outputting the extreme climate impacted areas and the CI intensities corresponding to the extreme climate events in the target region.

20. The system for identifying extreme climate events according to claim 19, wherein
- the method further comprises: outputting the IAD curves corresponding to the extreme climate events in the target region; and outputting the IAD envelope corresponding to the target region.

\* \* \* \* \*